United States Patent [19]

Okamoto

[11] Patent Number: 5,163,152
[45] Date of Patent: Nov. 10, 1992

[54] INTERRUPT CONTROL APPARATUS FOR A MICROPROCESSOR PROVIDING REAL TIME PRIORITY PROCESSING OF INTERRUPT REQUESTS

[75] Inventor: Kosei Okamoto, Kunitachi, Japan

[73] Assignee: Kabushiki Kaisha Toshiba, Kawasaki, Japan

[21] Appl. No.: 684,466

[22] Filed: Apr. 11, 1991

Related U.S. Application Data

[63] Continuation of Ser. No. 169,988, Mar. 18, 1988, abandoned.

Foreign Application Priority Data

Mar. 26, 1987 [JP] Japan ............................ 62-70481

[51] Int. Cl.⁵ .................................................. G06F 13/24
[52] U.S. Cl. .................................. 395/725; 364/DIG. 1; 364/242.8; 364/242.6; 364/242.1; 364/241.2; 364/241.4; 364/241.6
[58] Field of Search ................................ 395/725, 800

[56] References Cited

U.S. PATENT DOCUMENTS

| | | | |
|---|---|---|---|
| 3,290,658 | 12/1966 | Callahan et al. | 364/200 |
| 3,905,025 | 9/1975 | Davis et al. | 364/200 |
| 4,004,283 | 1/1977 | Bennett et al. | 364/200 |
| 4,056,847 | 11/1977 | Marcantonio | 364/200 |
| 4,172,284 | 10/1979 | Heinrich et al. | 364/200 |
| 4,200,912 | 4/1980 | Harrington et al. | 364/200 |
| 4,484,271 | 11/1984 | Miu et al. | 364/200 |
| 4,630,041 | 12/1986 | Casamatta et al. | 364/200 |
| 4,779,195 | 10/1988 | James | 364/200 |
| 4,807,117 | 2/1989 | Itoku et al. | 364/200 |

OTHER PUBLICATIONS

MC68020 32-Bit Microprocessor User's Manual, Motorola Inc., 1984, pp. 5-26-5-31.

*Primary Examiner*—Kevin A. Kriess
*Attorney, Agent, or Firm*—Foley & Lardner

[57] ABSTRACT

An interrupt control apparatus of a microprocessor comprises a controller for selecting an interrupt requirement having a highest priority from a plurality of interrupt requirements and outputting the signals indicative of this highest priority; a comparator for comparing the priority of the interrupt requirement selected by the interrupt controller with mask information indicating a priority as to whether the interrupt requirement is executed or not; a detector for detecting whether the priority of the interrupt requirement is outputted from the controller or not; and a judging device for stopping an output of the controller when the priority of the selected interrupt requirement is lower than the priority of the mask information. The judging device makes the controller further select an interrupt requirement having a highest priority from the plurality of interrupt requirements by the controller and output a signal indicative of this priority when the detector detects the stoppage of the output of the controller. The judging device instructs the execution of the selected interrupt requirement when the priority of the selected interrupt requirement is higher than or equal to the priority of the mask information.

11 Claims, 3 Drawing Sheets

INTERRUPT CONTROL APPARATUS FOR A MICROPROCESSOR PROVIDING REAL TIME PRIORITY PROCESSING OF INTERRUPT REQUESTS

This application is a continuation of application Ser. No. 07/169,988, filed Mar. 18, 1988, now abandoned.

The present invention relates to an interrupt control apparatus for a microprocessor performing interruption of the microprocessor in accordance with a priority signal.

BACKGROUND OF THE INVENTION

In a conventional microprocessor, the requirements of a plurality of interruptions generated from sections external and internal to the microprocessor are treated in accordance with a priority based on the importance and urgency thereof.

FIG. 1 shows the construction of a microprocessor for processing a plurality of interruptions. In FIG. 1, the plurality of interrupt requirements have their respective priorities which are supplied by an interrupt control circuit 1. The microprocessor 2 processes the interruptions in accordance with the interrupt priority signals generated by the interrupt control circuit 1 for receiving the plurality of interrupt requirements.

When the plurality of interrupt requirement signals are supplied to the interrupt control circuit 1, the interrupt control circuit 1 supplies to the microprocessor 2 an interrupt priority signals which indicate the priority of the interrupt requirement having a highest priority among the supplied interrupt requirements. When the microprocessor 2 receives the interrupt priority signals, the microprocessor judges whether this interrupt requirement has a priority to be processed, on the basis of the information of an interrupt priority control field (mask) in a control register disposed within the microprocessor 2. The mask holds a priority level which indicates the lowest limit of the interrupt priority to be processed, and is handled by a program. If the requirement does not have sufficient priority to be processed as a result of the judgment, the interrupt requirement is not processed until the mask information is changed to be less than the priority of the interrupt requirement by a program processed in the microprocessor 2.

When the mask information is changed to have the priority of the interrupt requirement, the interrupt requirement is processed. In this case, the next interrupt requirement is not processed until the former interrupt requirement has been processed, even if the priority of next interrupt requirement is higher than that of the former.

As mentioned above, in the conventional microprocessor, once the interrupt priority signals of the interrupt requirement are supplied to the microprocessor 2, the higher priority of next interrupt requirement is not processed until the former interrupt requirement has been processed.

Accordingly, even when the former interrupt requirement is waiting to be processed, and the interrupt control circuit 1 receives a next interrupt requirement having a priority higher than the priority of the former interrupt requirement, the interrupt control circuit 1 cannot change the interrupt priority signals to be those of the higher priority of the next interrupt requirement, so that the interrupt requirement having the higher priority cannot be processed until the waiting interrupt requirement has been processed.

Accordingly, in the conventional microprocessor, the interrupt requirement cannot be processed in accordance with priority at the real time.

SUMMARY OF THE INVENTION

To overcome the problems mentioned above, an object of the present invention is to provide an interrupt control apparatus of a microprocessor for processing an interrupt requirement in accordance with the priority at the real time.

With the above object in view, the present invention resides in an interrupt control apparatus of a microprocessor, comprising control means for selecting an interrupt requirement having a highest priority from a plurality of interrupt requirements and outputting a signal indicative of this highest priority; means for comparing the priority of the interrupt requirement selected by the interrupt control means with mask information indicating a priority as to whether the interrupt requirement is executed or not; means for detecting whether the priority of the interrupt requirement is outputted from the control means or not; and judging means for stopping an output of the interrupt control means when the priority of the interrupt requirement selected by the result of the comparing means is lower than the priority of the mask information, said judging means making the interrupt control means further select an interrupt requirement having a highest priority from the plurality of interrupt requirements and output the signals indicative of this priority when the detecting means detects the stoppage of the output of the interrupt control means, said judging means instructing the execution of the selected interrupt requirement when the priority of the selected interrupt requirement is higher than or equal to the priority of the mask information.

In the interrupt control apparatus of the microprocessor of the present invention mentioned above, when the priority of an interrupt requirement, selected from the plurality of interrupt requirements is lower than a priority indicating whether the interrupt requirement is performed or not, this interrupt requirement is not performed and the selection of the interrupt requirement having the highest priority from the plurality of the interrupt requirements can be performed.

BRIEF DESCRIPTION OF THE DRAWINGS

The present invention will be more apparent from the following description of the preferred embodiments thereof in the accompanying drawings in which.

DETAILED DESCRIPTION OF THE PREFERRED EMBODIMENTS

The preferred embodiments of the present invention will now be described with reference to the accompanying drawings.

Figure 1:
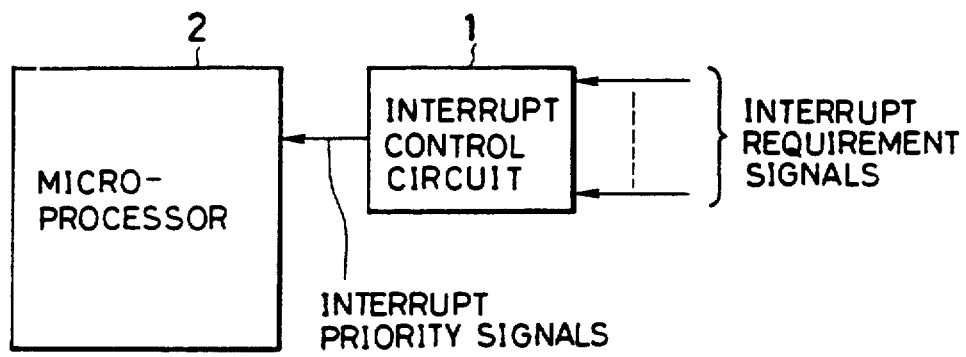
FIG. 1 is a view showing the construction of a conventional microprocessor for performing an interrupt control thereof.
Figure 2:
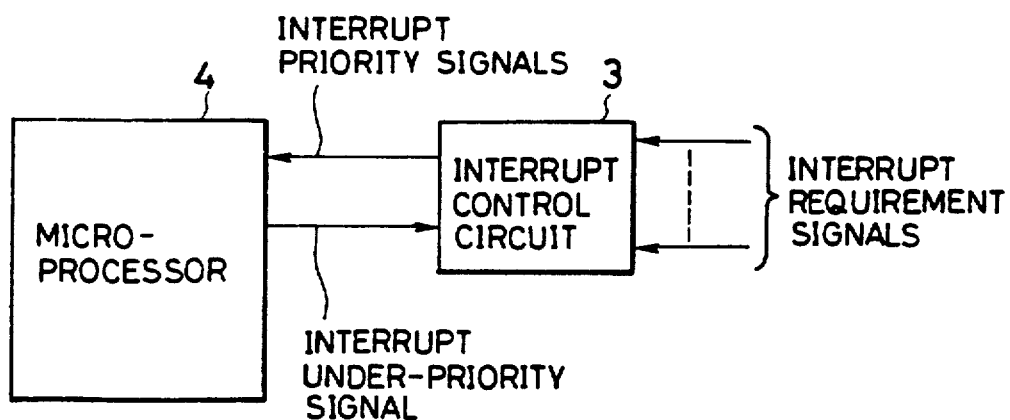
FIG. 2 is a block view showing the construction of an interrupt control apparatus of a microprocessor in accordance with one embodiment of the present invention.

FIG. 2 shows the construction of an interrupt control apparatus of a microprocessor in accordance with one embodiment of the present invention. In FIG. 2, the interrupt control apparatus of the microprocessor is constituted by an interrupt control circuit 3 and a microprocessor 4 for processing the interruption.

When the interrupt control circuit 3 receives a plurality of interrupt requirement signals, the interrupt control circuit 3 selects an interrupt requirement signal having the highest priority from the interrupt requirement signals, and supplies this interrupt priority to the microprocessor 4 through the interrupt priority signals. Further, when the interrupt control circuit 3 receives an interrupt under-priority signal supplied from the microprocessor 4, the interrupt control circuit 3 stops supplying the interrupt priority signal to the microprocessor 4.

In accordance with the interrupt priority signal supplied from the interrupt control circuit 3, the microprocessor 4 judges whether the interrupt requirement corresponding to this priority signal should be executed or not. As a result of the judgment, when the interrupt requirement should be executed, an interrupt generating signal is outputted to an unillustrated control section of the microprocessor 4. When the interrupt requirement should not be executed, an interrupt under-priority signal is supplied to the interrupt control circuit 3.

Figure 3:
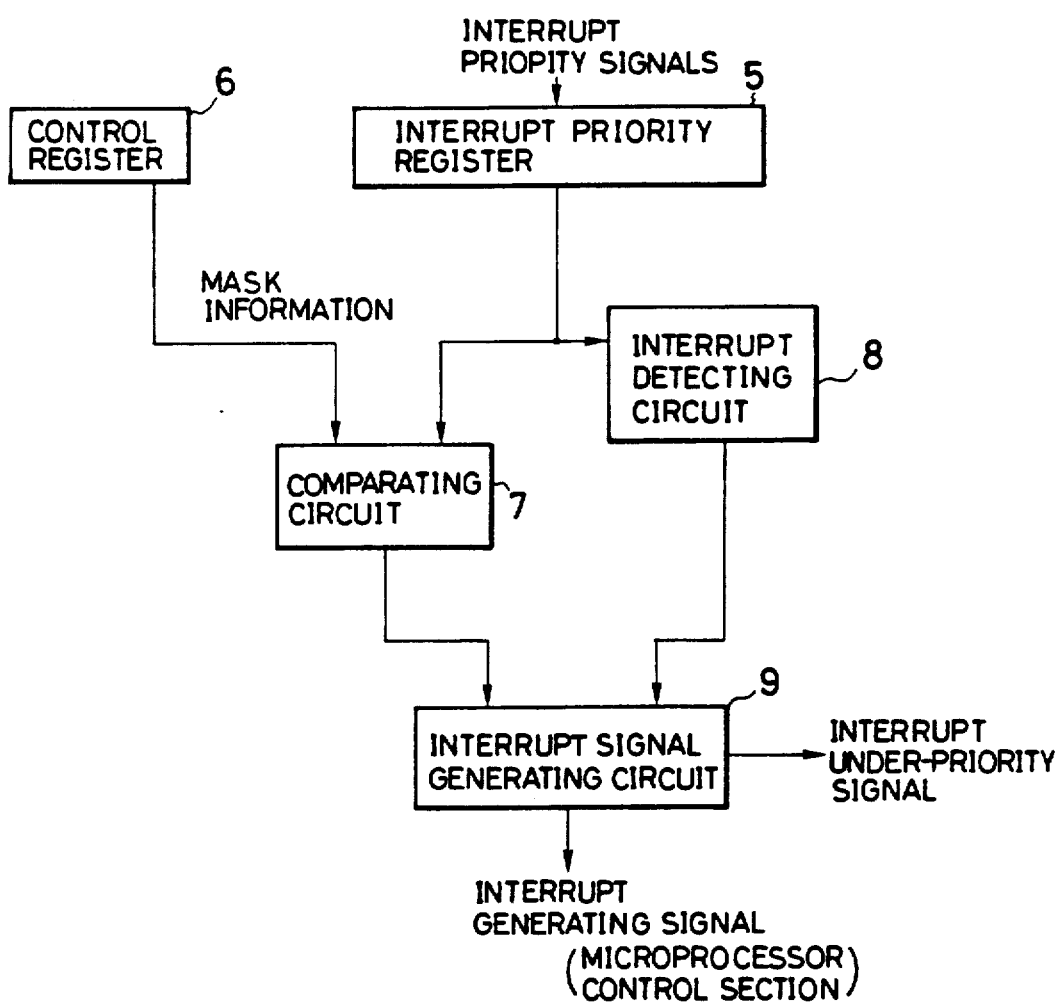
FIG. 3 is, a block view showing the construction of a main portion of the microprocessor of FIG. 2.

FIG. 3 shows the construction of the main portions of the system for performing an interrupt control of the microprocessor 3. In FIG. 3, the microprocessor 4 comprises an interrupt priority register 5, a control register 6, a comparing circuit 7, an interrupt detecting circuit 8, and an interrupt signal generating circuit 9.

When the interrupt priority register 5 receives an interrupt priority signal supplied from the interrupt control circuit 3, the priority value of this interrupt priority signal is stored into the interrupt priority register 5 in synchronization with a clock signal. The stored priority is supplied to the comparing circuit 7 and the interrupt detecting circuit 8.

The control register 6 has an interrupt control field for storing mask information of the interrupt priority for judging whether the microprocessor 4 should execute the interrupt requirement or not. The mask information is supplied to the comparing circuit 7, and changed by the execution of a program processed by the microprocessor 4.

When the comparing circuit 7 receives the mask information supplied from the control register 6 and the interrupt priority supplied from the interrupt priority register 5, the comparing circuit 7 compares the mask information and the interrupt priority, and the compared result is supplied to the interrupt signal generating circuit 9.

The interrupt detecting circuit 8 detects whether or not the interrupt priority in the interrupt priority register 5 indicates the existence of an interrupt, and the detected result is supplied to the interrupt signal generating circuit 9.

In accordance with the compared result supplied from the comparing circuit 7 and the detected result supplied from the interrupt detecting circuit 8, the interrupt signal generating circuit 9 outputs an interrupt generating signal when the interrupt requirement is acceptable, and an interrupt under-priority signal when the interrupt requirement is not acceptable.

Namely, in a state in which the interrupt priority is supplied from the interrupt priority register 5 to the interrupt detecting circuit 8 and this circuit 8 reports the existence of interrupt to the interrupt signal generating circuit 9, the mask information and the interrupt priority are compared with each other by the comparing circuit 7. When a value provided by the interrupt priority signal is smaller than a value provided by the mask information, the interrupt signal generating circuit 9 judges by this compared result that the priority of the interrupt requirement is lower than a priority to be processed, thereby supplying an interrupt under-priority signal to the interrupt control circuit 3.

In contrast, when the value of the interrupt priority signal is greater than or equal to the value of the mask information, the interrupt signal generating circuit 9 judges that the interrupt requirement corresponding to this interrupt priority signal has a priority higher than the priority to be processed, thereby outputting an interrupt generating signal.

When it is detected by the interrupt detecting circuit 8 that a interrupt priority signal is not outputted, the interrupt signal generating circuit 9 stops outputting the interrupt generating signal and the interrupt under-priority signal.

The operation of the interrupt control apparatus constructed above will next be described with reference to the timing chart shown in FIG. 4.

Figure 4:
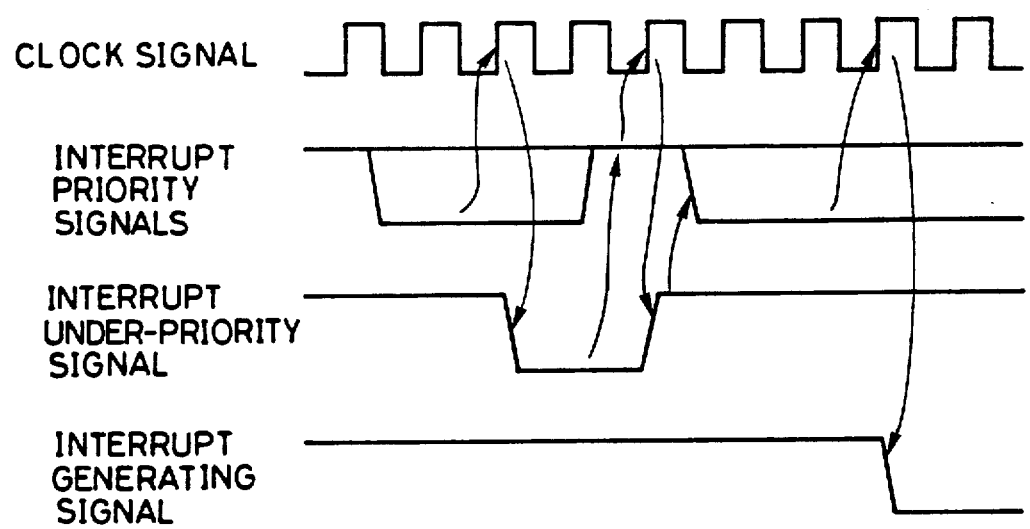
FIG. 4 is a view showing a timing chart of control sections of FIG. 2.

When a plurality of interrupt requirement signals are supplied to the interrupt control circuit 3, the interrupt control circuit 3 selects an interrupt requirement signal having a highest priority from the interrupt requirement signals, and the interrupt priority signal indicative of this interrupt requirement having the highest priority is stored into the interrupt priority register 5 of the microprocessor 4 in synchronization with the clock signal, as shown in FIG. 4. The stored interrupt priority signal is supplied to the comparing circuit 7, and is detected by the interrupt detecting circuit 8. It is also shown by the interrupt signal generating circuit 9 that the interrupt priority signal is outputted.

The interrupt priority signal is compared with the mask information by the comparing circuit 7. When the value of the interrupt priority signal is smaller than the value of the mask information, the interruption is not executed, and the interrupt under-priority signal is supplied to the interrupt control circuit 3.

Thus, the output of the interrupt priority signal to the interrupt priority register 5 is stopped. When the interrupt priority signals are not outputted, this state is detected by the interrupt detecting circuit 8, and it is communicated to the interrupt signal generating circuit 9 that the interrupt priority signals are not outputted, so that the interrupt under-priority signal is not outputted to the interrupt control circuit 3.

When the interrupt under-priority signal is not supplied to the interrupt control circuit 3, as shown in FIG. 4, interrupt priority signals of the interrupt requirement having a highest priority from the interrupt requirement signals supplied to the interrupt control circuit 3 at this time are supplied to the interrupt priority register 5.

The interrupt priority signals are compared with the mask information as mentioned above. When the value of the priority signal is greater than or equal to the value of the mask information, as shown in FIG. 4, an interrupt generating signal is outputted from the interrupt signal generating circuit 9, thereby executing the interrupt processing in the microprocessor 4.

Accordingly, when the priority of the interrupt requirement is lower than that of the mask information, an interrupt requirement signal having a highest priority from the interrupt requirement signals supplied to the interrupt control circuit 3 is supplied to the microprocessor 4 without awaiting the completion thereof until the interrupt requirement is executed by changing the mask information as in the conventional apparatus, thereby executing the interrupt requirements sequentially in accordance with the priority thereof at any time.

As mentioned above, in accordance with the present invention, when the priority of an interrupt requirement to be executed is lower than a priority for indicating whether the interrupt requirement should be executed or not, the interrupt requirement having a highest priority is selected from a plurality of interrupt requirements. Accordingly, the interrupt requirements can be processed sequentially in accordance with the higher priority without awaiting the completion of the execution of the interrupt requirement. Thus, the present invention provides an interrupt control apparatus of a microprocessor for processing the plurality of the interrupt requirements in accordance with the respective priorities at real time.

What is claimed is:

1. An interrupt control apparatus for a microprocessor, comprising:
    interrupt control means for selecting an interrupt requirement having a highest priority from a plurality of interrupt requirements and outputting priority signals indicative of said highest priority;
    means for comparing said highest priority of said interrupt requirement selected by said interrupt control means with mask information indicating a priority as to whether said interrupt requirement is executed or not;
    means for detecting whether or not said priority signals of said interrupt requirement are outputted form said control means;
    means for judging whether said interrupt requirement selected by said control means is executed or not based on a comparison of said highest priority of said selected interrupt requirement with said priority of said mask information;
    an interrupt priority register for receiving said interrupt priority signals selected by and supplied from said interrupt control means, and inputting and storing said interrupt priority signals in synchronization with a clock signal; and
    means for updating said priority signals stored in said register after judging that said interrupt requirement is not executed.

2. An interrupt control apparatus as claimed in claim 1, wherein said apparatus further comprises:
    a control register for storing said mask information indicating said interrupt priority for judging whether said interrupt requirement is executed or not by said microprocessor.

3. An interrupt control apparatus as claimed in claim 2, wherein:
    said comparing means compares said mask information from said control register with said interrupt priority signal from said interrupt priority register.

4. An interrupt control apparatus as claimed in claim 3, wherein:
    said judging means comprises an interrupt signal generating circuit for outputting an interrupt generating signal when said interrupt requirement is executed, and an interrupt under-priority signal when said interrupt requirement is not executed, in accordance with a compared result of said comparing means and a detected result of said detecting means.

5. An interrupt control apparatus for a microprocessor, comprising:
    interrupt control means for selecting an interrupt requirement having a highest priority from a plurality of interrupt requirements and outputting signals indicative of said highest priority;
    means for comparing said highest priority of said interrupt requirement selected by said interrupt control means with mask information indicating a priority as to whether said interrupt requirement is executed or not;
    means for detecting whether or not said highest priority of said interrupt requirement is outputted from said control means; and
    judging means for stopping an output of said control means when said highest priority of said selected interrupt requirement is lower than said priority of said mask information, said judging means making said control means further select an interrupt requirement having a highest priority from said plurality of interrupt requirements and output signals indicative of said output of said control means, said judging means instructing execution of said selected interrupt requirement when said priority of said selected interrupt requirement is higher than or equal to said priority of said mask information.

6. An interrupt control apparatus as claimed in claim 5, wherein said apparatus further comprises:
    an interrupt priority register for receiving an interrupt priority signal supplied from said interrupt control means, and inputting and storing said interrupt priority signal in synchronization with a clock signal.

7. An interrupt control apparatus as claimed in claim 6, wherein said apparatus further comprises:
    a control register for storing said mask information indicating said interrupt priority for judging whether said interrupt requirement is executed or not by said microprocessor.

8. An interrupt control apparatus as claimed in claim 7, wherein:
    said comparing means compares said mask information supplied from said control register with said interrupt priority signal supplied from said interrupt priority register.

9. An interrupt control apparatus as claimed in claim 8, wherein:
    said judging means comprises an interrupt signal generating circuit for outputting an interrupt generating signal when said interrupt requirement is executed, and an interrupt under-priority signal when said interrupt requirement is not executed, in accordance with a compared result of said comparing means and a detected result of said interrupt detecting means.

10. An interrupt control apparatus for a microprocessor, comprising:
    an interrupt control circuit for receiving a plurality of interrupt requirement signals and selecting an interrupt requirement signal having a highest priority from said interrupt requirement signals, and supplying said interrupt requirement signal having said highest priority to said microprocessor;
    an interrupt priority register for receiving said interrupt priority signal supplied from said interrupt control circuit, and inputting and storing said interrupt priority signal in synchronization with a clock signal;

a control register for storing mask information indicating an interrupt priority for judging whether said the interrupt requirement is executed or not by said microprocessor;

a comparator for comparing said mask information from said control register and said interrupt priority signal from said interrupt priority register;

an interrupt detecting circuit for detecting whether or not said interrupt priority signal is outputted from said interrupt control circuit to said interrupt priority register; and an interrupt signal generating circuit for outputting an interrupt generating signal when said interrupt requirement is executed, and an interrupt under-priority signal when said interrupt requirement is not executed, in accordance with a compared result of said comparator and a detected result of said interrupt detecting circuit.

11. An interrupt control system for providing interrupt operation for a microprocessor, said system comprising:

a priority signal generator for outputting an interrupt priority signal indicating a highest priority of a plurality of interrupt request signals input to said generator;

an interrupt priority signal register connected to said priority signal generator for holding said interrupt priority signal;

a control register for holding information of a reference priority corresponding to an operational condition of said microprocessor as a criterion for actually providing an interrupt in accordance with said interrupt priority signal;

a comparison circuit for comparing said highest priority to said reference priority;

an interrupt signal generator coupled with said comparison circuit and outputting an interrupt signal to said microprocessor to actually provide said interrupt operation, wherein said interrupt signal generator defers outputting said interrupt signal and instead transmits to said interrupt priority generator, when said highest priority is lower than said reference priority, an interrupt under-priority signal indicating that an interrupt request cannot be accepted, and wherein, when said interrupt under-priority signal is transmitted, said interrupt priority signal register is updated with said interrupt priority signal indicating said highest priority of said plurality of interrupt signals input to said generator.

* * * * *